(12) United States Patent
Aesch, Jr.

(10) Patent No.: US 6,662,490 B1
(45) Date of Patent: Dec. 16, 2003

(54) CORE HOLE PLUG ASSEMBLY

(76) Inventor: Harold W. Aesch, Jr., 915 E. Fork Dr., Phoenix, AZ (US) 85048

( * ) Notice: Subject to any disclaimer, the term of this patent is extended or adjusted under 35 U.S.C. 154(b) by 0 days.

(21) Appl. No.: 10/225,894

(22) Filed: Aug. 22, 2002

(51) Int. Cl.[7] ............................................. A01M 1/20
(52) U.S. Cl. ........................ 43/124; 43/131; 43/132.1
(58) Field of Search .............................. 43/124, 132.1, 43/131; 215/294, 296, 355, 358, 360, 363, 364; 49/463, 466, 475.1; 285/338; 138/89

(56) References Cited

U.S. PATENT DOCUMENTS

| | | | | |
|---|---|---|---|---|
| 820,469 A | * | 5/1906 | Bennett | 215/360 |
| 966,748 A | * | 8/1910 | Honecker | 285/338 |
| 1,156,915 A | * | 10/1915 | Mazoyer | 215/294 |
| 1,239,225 A | * | 9/1917 | Sampson | 215/360 |
| 1,464,646 A | * | 8/1923 | Cross | 215/360 |
| 1,493,501 A | * | 5/1924 | Rice | 215/364 |
| 2,072,426 A | * | 3/1937 | Kraft | 215/360 |
| 2,245,887 A | * | 6/1941 | Wikander | 138/89 |
| 2,292,149 A | * | 8/1942 | Moeller | 215/364 |
| 2,312,738 A | * | 3/1943 | Ulanet | 215/360 |
| 2,424,930 A | * | 7/1947 | Jackson | 215/360 |
| 2,439,628 A | * | 4/1948 | Kopecky | 215/360 |
| 2,445,325 A | * | 7/1948 | Hemp | 215/360 |
| 2,493,452 A | * | 1/1950 | Grigg | 138/89 |
| 2,616,582 A | * | 11/1952 | Kappes et al. | 215/360 |
| 2,886,067 A | * | 5/1959 | Maxwell et al. | 215/360 |
| 2,946,491 A | * | 7/1960 | Bramming | 215/364 |
| 3,114,528 A | * | 12/1963 | Forest | 138/89 |
| 3,317,071 A | * | 5/1967 | Teeter | 215/360 |
| 3,371,418 A | * | 3/1968 | Moeller | 215/360 |
| 3,550,635 A | * | 12/1970 | Schroer | 138/89 |
| 3,618,809 A | * | 11/1971 | Martino | 138/89 |
| 4,060,100 A | * | 11/1977 | Miller et al. | 138/89 |
| 5,035,266 A | * | 7/1991 | Benson et al. | 138/89 |
| 5,297,691 A | * | 3/1994 | Bottcher | 138/89 |
| 5,429,394 A | * | 7/1995 | Olson | 138/89 |
| 5,735,425 A | * | 4/1998 | Beadle | 215/360 |
| 5,904,965 A | * | 5/1999 | Noel et al. | 215/358 |
| 5,927,000 A | * | 7/1999 | Bordes, Jr. | 43/132.1 |
| 6,079,150 A | * | 6/2000 | Setikas et al. | 43/132.1 |
| 6,176,267 B1 | * | 1/2001 | Dugan et al. | 138/89 |
| 6,357,170 B1 | * | 3/2002 | Bordes, Jr. | 43/124 |
| 6,419,104 B1 | * | 7/2002 | Sarajian | 215/358 |
| 6,453,603 B1 | * | 9/2002 | Baker | 43/132.1 |
| 6,526,689 B2 | * | 3/2003 | Moore | 43/4 |

* cited by examiner

*Primary Examiner*—Darren W. Ark
(74) *Attorney, Agent, or Firm*—John D. Lister

(57) ABSTRACT

A core hole plug assembly for covering and sealing a hole in a paved surface, wall or other structure. The core hole plug assembly includes: a cover plate, a resilient expansible cylindrical plug, a compression plate, and a bolt and nut assembly for moving the compression plate relative to the cover plate to expand or reduce the outside diameter of the expansible plug. The compression plate is permanently secured to a lower end portion of the expansible plug and, preferably, the upper end of the expansible plug is permanently secured to the underside of the cover plate.

1 Claim, 1 Drawing Sheet

CORE HOLE PLUG ASSEMBLY

BACKGROUND OF THE INVENTION

The subject invention relates to an improved core hole plug assembly for covering and sealing a core hole or other hole in a paved surface, a hollow or solid wall such as a concrete or block wall, or other structure.

In many locations, especially in urban environments, office parks, and shopping centers, office, industrial, commercial and other buildings are surrounded in whole or in part with paved surfaces such as but not limited to concrete paving, asphalt paving, stone or brick paving, and paving made of similar materials. The paving takes many forms, e.g. driveways, sidewalks, etc. A typical paving is a concrete slab or other paving material about four to eight inches thick. Offices, warehouses, and other industrial and commercial buildings often have solid or hollow walls made of concrete, block or other materials of various thicknesses e.g. walls having thicknesses of six to eight inches or more. Core holes or other holes, typically about three inches but sometimes greater in diameter, are sometimes formed in these paved surfaces and walls for various purposes, such as but not limited to, tests to determine if the paving or wall meets specifications, the treatment of cockroaches, ants, and various other pests, the passage of utilities through the walls, etc. Once a core has been taken from or a hole otherwise made in a paved surface, wall or other structure there usually is a need to cover and seal the hole, e.g. after a core sample has been taken, after pests have been treated, prior to the installation or after the removal of utilities, etc. Since core hole plugs are easy to install and unobtrusive or inconspicuous, rather than patching these holes, these holes are frequently covered and sealed with core hole plugs. In addition to being easy and quick to install and unobtrusive or inconspicuous, the core hole plugs have another advantage over patching the holes. Should there be a need to later gain access to the interior of the hole, the core hole plug can be removed.

However, the use of conventional core hole plugs to cover and seal core holes and other holes passing through a paved surface and into the soil beneath the paving or passing partially or completely through a wall or other structure has presented problems. Frequently, the soil has fallen away from and is spaced below the underside of the paving layer and the depth of a hole passing through a paving layer can be several inches deeper than the thickness of the paving layer to form a relatively inaccessible cavity. Hollow walls also contain relatively inaccessible cavities. The core hole plug assemblies currently in use include a cover plate, an expansible plug, a compression plate, and a bolt and nut assembly for moving the compression plate relative to the cover plate to expand and reduce the outer diameter of the expansible plug. The compression plates of these assemblies are not permanently secured to the lower end portions of the expansible plugs and the expansible plugs are not permanently secured to the cover plates. The cover assemblies are removably anchored in place by tightening the bolt and nut assemblies to expand the expansible plugs into contact with the sidewalls of the holes and are removed from the holes by loosening the bolt and nut assemblies so that the expansible plugs contract. While these core hole plug assemblies work well, the use of such core hole plug assemblies presents problems. After the core hole plug assemblies have been in place for a period of time, the plugs sometimes become stuck to the sidewalls of the holes or become otherwise hard to remove from the holes. A worker while attempting to loosen a plug from the sidewall of a hole may loosen the bolt and nut assembly too much permitting the nut and compression plate of the core hole plug assembly to fall into a wall cavity or down into a hole passing through a paved surface where the diameter of the compression plate (approximately the unexpanded diameter of the plug and only slightly less in diameter than the hole) in combination with the depth of the relatively narrow size of the hole (typically about 6 or more inches in depth and 3 inches in diameter) can make the nut and compression plate hard to retrieve or practically irretrievable. Once the nut and compression plate have become separated from the bolt of the core hole plug assembly's bolt and nut assembly, the plug, which is not secured to the cover plate, must also be retrieved from within the hole. This further complicates matters, as the diameter of the plug approximates the diameter of the hole from which the plug must now be retrieved. Thus, there has been a need for a core hole plug assembly that solves the problems that can arise when attempting to remove a conventional core hole plug assembly from a hole.

SUMMARY OF THE INVENTION

The core hole plug assembly of the subject invention covers and seals a hole in a paved surface, wall or other structure and facilitates the easy removal of the entire core hole plug assembly from a hole without losing the nut and compression plate or the plug down within the hole or wall. The core hole plug assembly of the subject invention includes: a cover plate, a resilient expansible cylindrical plug, a compression plate, and a bolt and nut assembly for moving the compression plate relative to the cover plate to expand or reduce the outside diameter of the expansible plug. The compression plate is permanently secured to a lower end portion of the expansible plug and, preferably, the upper of the expansible plug is permanently secured to the cover plate.

DESCRIPTION OF THE PREFERRED EMBODIMENTS

Figure 1:
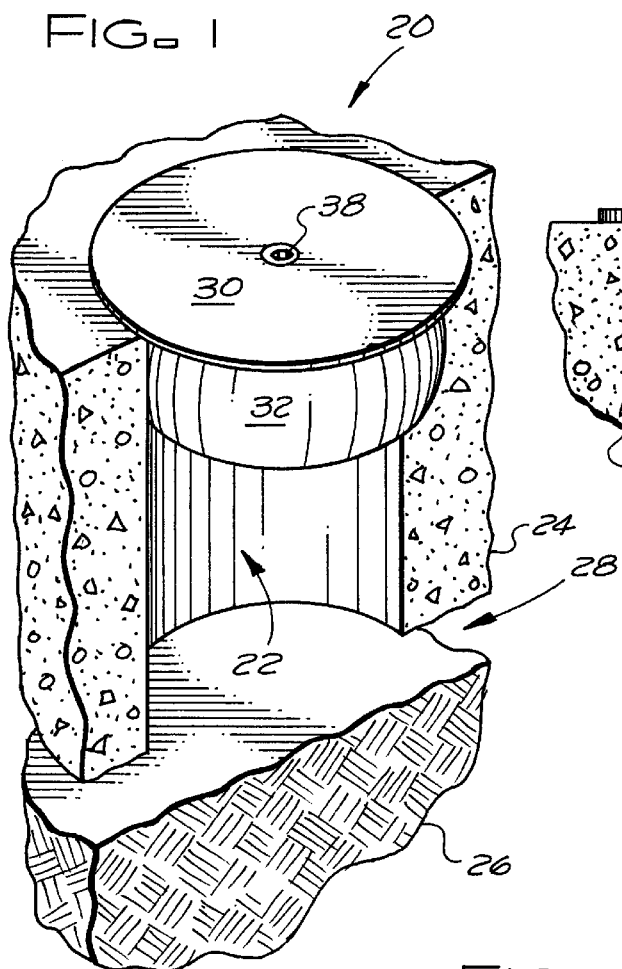
FIG. 1 is a perspective view of a core hole plug assembly of the subject invention sealing a hole passing through a paving layer.
Figure 2:
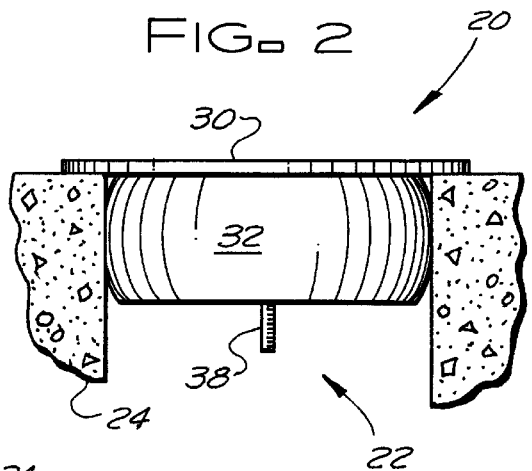
FIG. 2 is a side view of the core hole plug assembly of FIG. 1 sealing a hole passing through a paving layer.

While the core hole plug assembly 20 of the subject invention can be used for many different applications to cover and seal a hole in a paving layer, hollow or solid wall, or other structure. For the purposes of illustration, the core hole plug assembly 20 is shown in FIG. 1 covering and sealing a hole 22 passing through a paving layer 24. The paving layer 24 may be any of numerous paving layers found adjacent and/or under building structures, such as but not limited to concrete paving or slabs, asphalt paving, stone or brick paving, and paving made of similar materials. The paving layers are typically about four to eight inches in thickness and the core holes 22 passing through these paving layers are typically about 3 inches in diameter. Since the soil 26 beneath a paving layer 24 may fall away from the bottom of the paving layer, a hole 22 passing through a paving layer is frequently several inches greater in depth than the thickness of the paving layer and may include a cavity 28 beneath a paving layer into which components of a core hole plug assembly may fall.

The core hole plug assembly 20 includes a cover plate 30; a deformable, resilient expansible plug 32; a compression plate 34; and a bolt and nut assembly 36 with a bolt 38 and a nut 40. The expansible plug 32 is cylindrical with a tubular sidewall 42. Preferably, the compression plate 34 is a circular disk and the nut 40 of the bolt and nut assembly 36 is welded or otherwise nonrotatably affixed to and integral with the compression plate 34. The compression plate 34 is permanently and nonrotatably secured to the lower end portion 44 of the expansible plug 32, preferably, by being molded into or otherwise completely embedded within the lower end portion 44 of the expansible plug 32 so that the compression plate 34 does not rotate relative to the expansible plug. Preferably, the upper end of the expansible plug 32 is permanently and nonrotatably secured to the underside of the cover plate 30, e.g. adhesively or otherwise bonded to the underside of the cover plate, so that the expansible plug does not rotate relative to the cover plate. With the nut 40 of the bolt and nut assembly 36 nonrotatably affixed to the compression plate 34, the compression plate 34 nonrotatably secured to the lower end portion 44 of the expansible plug 32, and expansible plug 32 nonrotatably affixed to the underside of the cover plate 30, these components of the core hole plug assembly 20 function as a unit so that the bolt 38 of the bolt and nut assembly 36 can be threaded into or out of the nut 40 to move the compression plate 34 relative to the cover plate 30 (toward or away from the cover plate 30).

The bolt 38 of the bolt and nut assembly 36 passes down through a hole in the cover plate, through the expansible plug 32 and is threaded into the nut 40 affixed to the compression plate 34. When the bolt and nut assembly 36 is tightened by threading the bolt 38 into the nut 40, the compression plate 34 is drawn toward the cover plate 30 to compress the expansible plug 32 between the compression plate 34 and the cover plate 30 and expand the expansible plug 32 in diameter. When the bolt and nut assembly 36 is loosened by partially unthreading the bolt 38 from the nut 40, the compression plate 34 is moved away from the cover plate 30 and permits the resilient expansible plug 32 to return to its original shape and diameter. In use, as the expansible plug 32 is compressed by tightening the bolt and nut assembly 36 and drawing the compression plate 34 toward the cover plate 30, the expansible plug 32 expands in diameter to force the outside surface of the expansible plug 32 into contact with the sidewall of a hole. This secures the core hole plug assembly 20 in place and forms a seal between the outside surface of expansible plug 32 and the sidewall of the hole. When the bolt and nut assembly 36 is loosened and the expansible plug 32 is allowed to return to its initial shape and diameter, the outside surface of the expansible plug 32 draws away from the sidewall of the hole and the core hole plug assembly 20 can be easily removed as a unit without fear of losing a nut, compression plate, or plug down the hole or wall cavity.

The cover plate 30 and the compression plate may be made of stainless steel, aluminum, a durable polymeric material, a durable fiberglass reinforced polymeric material or some other suitable durable, preferably noncorrosive and chemical resistant material. Preferably, the bolt and nut assembly 36 is made with a stainless steel bolt 38 and a stainless steel nut 40. Various heads may be used on the bolt 38 of the bolt and nut assembly 36 so that the bolt and nut assembly can be tightened and loosened using a wrench, an alan wrench, a screwdriver, or other tool. Preferably, there is a recess in the upper surface of the cover plate 30 surrounding the hole through which the bolt passes. The head of the bolt 38 is received within the recess so that the head of the bolt is flush or substantially flush with the upper surface of the cover plate 30. The expansible plug 32 is made of a deformable and resilient polymeric material, such as but not limited to a deformable, resilient thermoplastic rubber or polymeric material, which has the resilience to return to its original diameter and shape when the expansible plug 32 is not under compression. Preferably, the material forming the expansible plug 32 is also durable and chemical resistant. The cover plate 30 is greater in diameter than the diameter of the expansible plug 32 and any hole the core hole plug assembly 20 is to seal. The compression plate 34 is typically made of stainless steel and is a little less than but about the same diameter as the diameter of the expansible plug 32. The cover plate 30 is typically about 3½ to 4 inches in diameter. When not compressed, the expansible plug 32 is typically about ⅛ to about ¼ of an inch less in diameter than the diameter of the hole with which the core hole plug assembly 20 is to be used (e.g. about 2¾ to about 2⅞ inches in diameter for use with a hole about 3 inches in diameter) and about 1 to 1½ inches in height.

Figure 4:
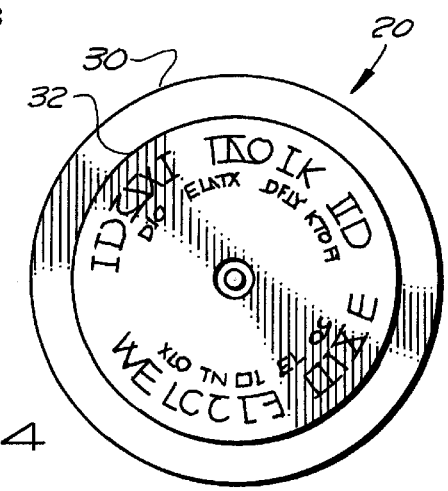
FIG. 4 is a bottom view of the core hole plug assembly of FIGS. 1 to 3.
Figure 3:
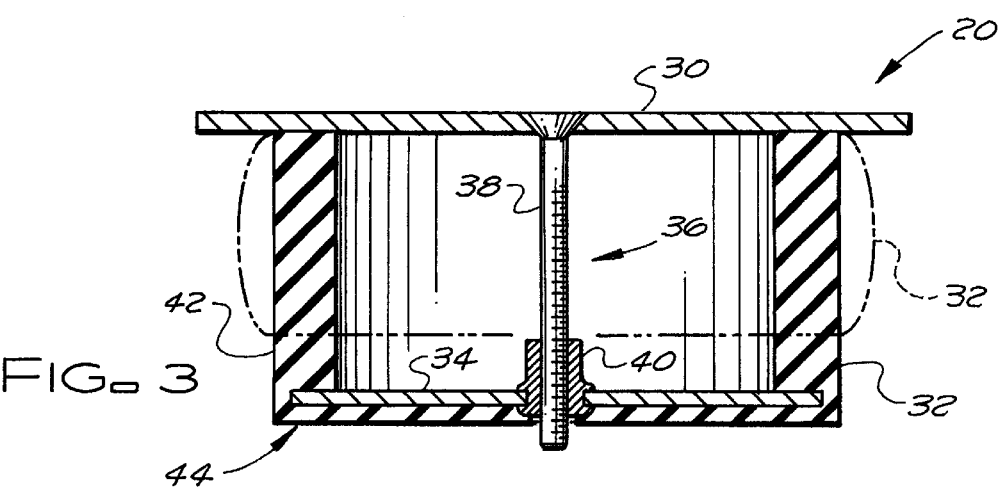
FIG. 3 is a vertical cross section of the termite lure of FIGS. 1 and 2.

With the compression plate 34 completely embedded within the lower end portion 44 of the expansible plug 32, the polymeric material forming the expansible plug forms a lowermost disk shaped layer of the assembly. As shown in FIG. 4, the exposed surface or underside of this disk shaped layer can have directions, a logo or other indicia embossed, debossed or otherwise imprinted thereon.

In describing the invention, certain embodiments have been used to illustrate the invention, and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A core hole plug assembly for covering and sealing a hole, comprising:

a stainless steel cover plate; the cover plate having an upper side and a lower side; the cover plate having an outer diameter greater than a diameter of a hole to be covered and sealed by the core hole plug assembly; the cover plate having a central opening therein for receiving a bolt shaft of a stainless steel bolt and nut assembly for moving a stainless steel compression plate relative to the cover plate;

a resilient expansible cylindrical plug made of a polymeric material; the expansible plug having an upper end and a lower end portion; the upper end of the expansible plug being permanently and nonrotatably bonded to the underside of the cover plate; the expansible plug having a tubular sidewall; the expansible plug, in an unexpanded state, having an outside diameter between about 2¾ and about 2⅞ inches and a height between about 1 and 1½ inches; the expansible plug having an unexpanded outer diameter less than the diameter of the cover plate and about ⅛ to about ¼ of an inch less than a diameter of a hole to be covered and sealed by the core hole plug assembly; the expansible plug being expandable to an outer diameter greater than a diameter of a hole to be covered and sealed by the core hole plug assembly; the polymeric material of the expansible plug forming a lowermost disk shaped layer of the core hole plug assembly and having indicia thereon;

the compression plate having a diameter equal to or less than the unexpanded outer diameter of the expansible plug; the compression plate being permanently and nonrotatably secured to the lower end portion of the expansible plug by being embedded in the lower end portion of the expansible plug; and the nut of the bolt and nut assembly for moving the compression plate relative to the cover plate being permanently and nonrotatably secured to the compression plate; the bolt of the bolt and nut assembly having a head on the upper side of the cover plate and a shaft passing through the central opening in the cover plate, through the expansible plug and threaded into the nut whereby the expansible plug can be expanded in diameter by tightening the bolt and nut assembly and reduced in diameter by loosening the bolt and nut assembly; and the central opening in the cover plate having a recess therein so that the head of the bolt is substantially flush with an upper surface of the cover plate.

\* \* \* \* \*